United States Patent
Finlow-Bates

(10) Patent No.: US 9,894,485 B2
(45) Date of Patent: Feb. 13, 2018

(54) PEER-TO-PEER GEOLOCATION SYSTEM

(71) Applicant: Keir Finlow-Bates, Kangasala (FI)

(72) Inventor: Keir Finlow-Bates, Kangasala (FI)

( * ) Notice: Subject to any disclaimer, the term of this patent is extended or adjusted under 35 U.S.C. 154(b) by 91 days.

(21) Appl. No.: 14/981,803

(22) Filed: Dec. 28, 2015

(65) Prior Publication Data

US 2017/0188197 A1 Jun. 29, 2017

(51) Int. Cl.
| | |
|---|---|
| *H04L 29/00* | (2006.01) |
| *H04W 4/02* | (2018.01) |
| *G01S 19/13* | (2010.01) |
| *G01S 5/00* | (2006.01) |
| *G01S 5/02* | (2010.01) |
| *H04W 12/04* | (2009.01) |
| *H04L 12/26* | (2006.01) |
| *H04L 29/08* | (2006.01) |
| *H04L 9/32* | (2006.01) |
| *H04L 9/30* | (2006.01) |
| *H04L 9/14* | (2006.01) |

(Continued)

(52) U.S. Cl.
CPC .......... *H04W 4/025* (2013.01); *G01S 5/0072* (2013.01); *G01S 5/0226* (2013.01); *G01S 19/13* (2013.01); *H04L 9/14* (2013.01); *H04L 9/30* (2013.01); *H04L 9/3247* (2013.01); *H04L 43/065* (2013.01); *H04L 63/06* (2013.01); *H04L 63/083* (2013.01); *H04L 67/104* (2013.01); *H04W 12/04* (2013.01); *H04W 12/06* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 2014/0074667 A1 | 3/2014 | Smith | |
| 2016/0086175 A1* | 3/2016 | Finlow-Bates | ....... H04L 9/3271 705/77 |

(Continued)

FOREIGN PATENT DOCUMENTS

| | | |
|---|---|---|
| AU | 2015901851 | 5/2015 |
| AU | 2016202841 A1 | 12/2016 |

OTHER PUBLICATIONS

Applied Cryptography by Bruce Schneier; Publisher: John Wiley & Sons, Inc.; Year: 1996.*

(Continued)

*Primary Examiner* — Madhuri Herzog

(57) ABSTRACT

A method and apparatus for location sharing, consisting of sending a location report by a location determining device to a plurality of network enabled devices over a peer-to-peer network, the location determining device being associated with a first digital key pair. A first of the plurality of network enabled devices, associated with a second digital key pair, performs a validation computation on the location report and submits a validation computation result and the location report to a remainder of the plurality of network enabled devices for inclusion in a shared ledger. Including the location report creates commercially-valued credits associated with the public key of the second digital key pair recorded in the shared ledger. A transfer of commercially-valued credits from association with the first public key of the first digital key pair to the public key of the second digital key pair is also recorded in the shared ledger.

20 Claims, 8 Drawing Sheets

(51) Int. Cl.
*H04L 29/06* (2006.01)
*H04W 12/06* (2009.01)

(56) References Cited

U.S. PATENT DOCUMENTS

2016/0342977 A1* 11/2016 Lam .................. G06Q 20/02
2017/0046792 A1*  2/2017 Haldenby .......... G06Q 20/0655
2017/0076280 A1*  3/2017 Castinado ............ G06Q 20/382

OTHER PUBLICATIONS

Zyskind, Guy, and Oz Nathan. "Decentralizing privacy: Using blockchain to protect personal data." Security and Privacy Workshops (SPW), 2015 IEEE. IEEE, 2015.*

Arunkumar, Saritha, et al. "Global attestation of location in mobile devices." Military Communications Conference, MILCOM 2015-2015 IEEE. IEEE, 2015.*

Globa Positioning Systems Directorate Systems Engineering & Integration Interface Specification IS-GPS-200, Revision H, Jul. 28, 2016. NASA.

\* cited by examiner

PEER-TO-PEER GEOLOCATION SYSTEM

TECHNICAL FIELD

The invention relates to computer systems and methods for reporting and recording device locations, and more specifically to the reporting of device locations to a shared file, distributed and maintained over a peer-to-peer network.

BACKGROUND OF THE INVENTION

An entity such as a parent of a child, a haulage company or delivery service, a prison system, or a car rental company, may need to track a location of users or assets, for example but not limited to: ensuring safety, for legal reasons, or in order to secure such assets.

A common method for reporting and storing location data is in a database connected to a network such as are known from US2014074667.

If a location data is recorded in a database maintained by the entity, there are high costs associated with installing and maintaining the hardware and network infrastructure.

If the location is recorded in a facility maintained by a third party such as a data storage provider, then there is a risk that due to network failure or other technical issues the data storage facility will at some times not be available to be queried by the entity, or to be written to by a location aware device to be tracked by the entity. In extreme cases the location data may be irretrievably lost.

Furthermore, if the database is maintained by the third party, there is a risk that the location data may be revealed to other parties, hacked, corrupted, or otherwise altered, without the knowledge of the entity or possibly the third party.

It is the intention of the present invention to address the shortcomings of the prior art, i.e. the problems of establishing and maintaining a network enabled data storage system, ensuring the integrity of the stored data, and providing always-available data access for users of the system. Furthermore, if the method used is based on a distributed system, no individual maintenance costs arise, there is no single point of failure, and through an inherent cryptographic structure integrity is maintained.

SUMMARY OF THE INVENTION

In accordance with the present invention, a solution is provided for reporting, storing and subsequently retrieving the locations of devices or objects in a distributed and secure manner. The problems are establishing and maintaining a network enabled data storage system, ensuring the integrity of the stored data, and providing always-available data access for users of the system. If the method used is based on a distributed system, no individual maintenance costs arise, there is no single point of failure, and through an inherent cryptographic structure integrity is maintained.

Embodiments of the invention are based on the reporting of location in a location report by a network enabled location determining device communicating through a peer-to-peer network system to a plurality of network enabled devices. A first of the plurality of network enabled devices performs a validation computation on the location report and forwards a result of the validation computation to the plurality of network enabled devices for inclusion in a shared ledger of location reports.

The network enabled location determining device may include a location module that may comprise a global navigation satellite system receiver (GNSS receiver), a magnetometer, an accelerometer, an altimeter, and a gyroscopic sensor for determining the location of the device. Further methods and apparatus for determining the location of the device may include trilateration or time difference of arrival calculations using a wireless local area network (WLAN), Bluetooth, or a wireless wide area network (WWAN) positioning method, position determination using fluctuations in a detected magnetic field, or a hybrid combination of all the aforementioned systems to produce an accurate location fix.

The decision by the network enabled location determining device to determine and report a location may be triggered through: an external request over a communication network channel; on a regular timed basis, for example but not limited to one location determination every ten minutes; an external trigger detected by the network enabled device's sensors, for example due to a change in motion detected by the accelerometer or a change in orientation detected by the gyroscopic sensor or magnetometer; a completion of a computation on the network enabled location determining device; or some other internal or external event.

In some embodiments of the invention the location report may be signed by the network enabled location determining device using an associated public-private key pair, for example using the ECDSA signature scheme, the ElGamal signature scheme, the DSA signature scheme, or some other asymmetric key infrastructure.

In further embodiments of the invention at least part of the location report may be encrypted using an asymmetric or symmetric cryptographic key generated by the network enabled location determining device, to prevent unauthorized third parties from scanning the shared ledger and extracting the location of the location determining network enabled device at reported times. The cryptographic key may then be shared with selected parties in subsequent reports submitted for inclusion in the shared ledger, or the cryptographic key may be encrypted with the public key of a public-private key pair and appended to the location report.

When the location report is submitted to the peer-to-peer network, a subset of the plurality of network enabled devices associated with the peer-to-peer network may forward copies of the location to a remainder of the plurality of network enabled devices. Network enabled devices on the peer-to-peer network may be standard nodes, in that they forward location reports on to other devices on the peer-to-peer network, or they may be "miners", which are nodes that also perform validation computations on a submitted location report in order to solve a proof-of-work or other computationally difficult problem that confirms to other nodes and miners that the submitted location report should be added to the shared ledger.

The first of the plurality of network enabled devices to successfully generate a validation computation result may submit this, together with the location report, to the peer-to-peer network. The remainder of plurality of network enabled devices may then check the validation computation. If it is correct, they may add it to the shared ledger. In this manner, the location report is stored in the shared ledger for future retrieval and examination.

In order to provide an incentive for third parties to join the peer-to-peer network as miners, a commercially-valued credit system may be associated with the described system. When the validation computation result and location reports are submitted to the peer-to-peer network by the first of the plurality of network enabled devices, it may also submit a notification that a number of commercially-valued credits are to be credited to a public key of a private-public key pair generated by the first of the plurality of network enabled devices. When the remainder of the plurality of network enabled devices add the location report and the validation computation result to the shared ledger, they also add this notification to the shared ledger.

A submission comprising one or more location reports, a validation computation result and a commercially-valued credit notification will henceforth be described as a "block". The awarding of commercially-valued credits on successfully producing an accepted block provides third parties with a motivation to allocate computing resources and hardware to work on the production of blocks. Blocks may also be constructed to comprise a transaction report that reallocates commercially-valued credits from a first public key to a second public key, by signing the transaction report with a private key of the first public key.

In another embodiment, the location report submitted by the location determining network enabled device may contain an offer of commercially-valued credits that are allocated to a public key of the public-private key pair associated with the location determining network enabled device. The commercially-valued credits may then be claimed by the first of the plurality of network enabled devices to produce a block accepted into the public ledger, for example by including a transaction notification in the block that reallocates the commercially-valued credits to the public key of the first of the plurality of network enabled devices.

Those skilled in the art will further appreciate the advantages and superior features of the invention together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present invention. In the figures, like reference numerals designate corresponding parts throughout the different views.

DETAILED DESCRIPTION OF THE INVENTION

Aspects of this disclosure will be described in the context of an exemplary system of a plurality of location determining network connected devices and a plurality of network connected devices communicating through the medium of a peer-to-peer network system 100, as shown schematically in FIG. 1. As depicted, the peer-to-peer network 108 is embodied within a packet switched network 101, through the interconnection of the plurality of network connected devices on the peer-to-peer network 108.

Figure 1:
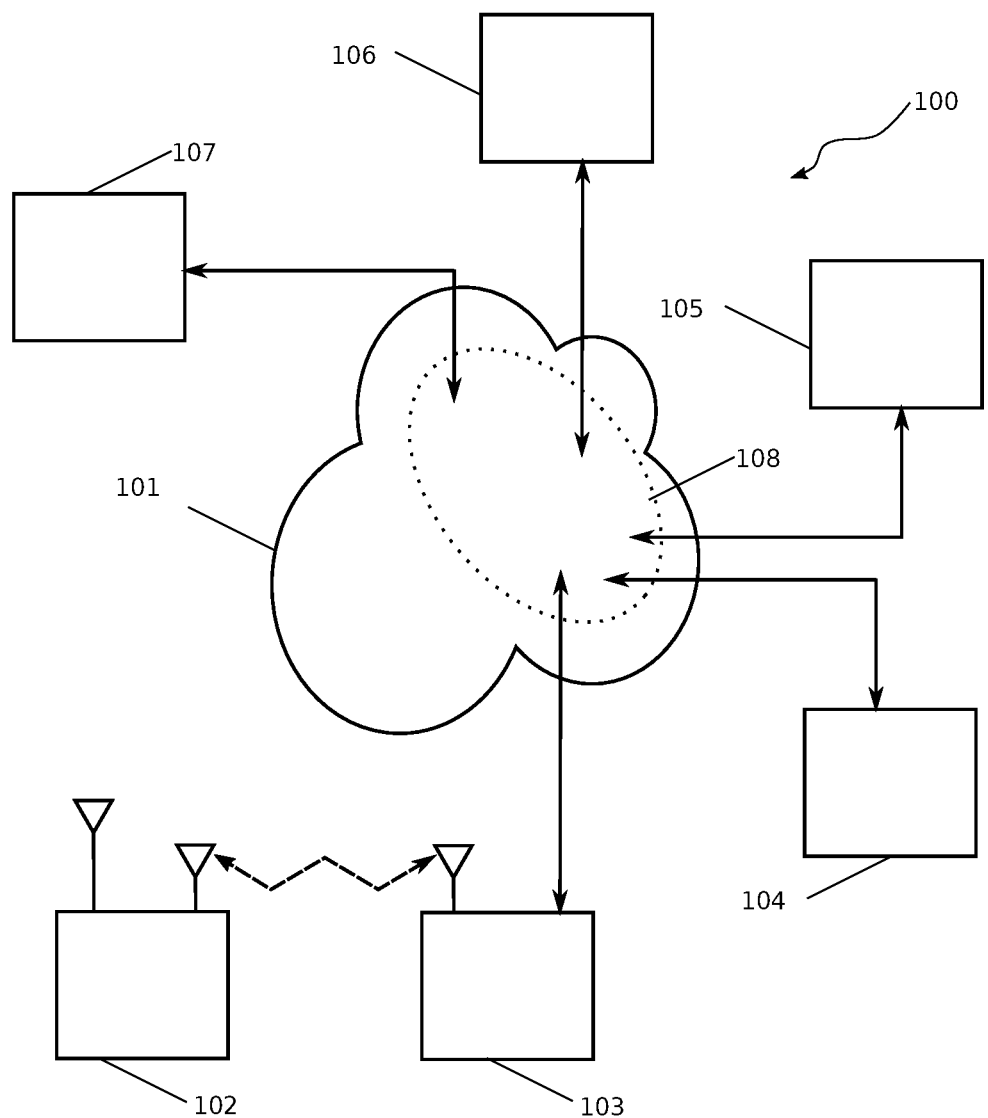
FIG. 1 illustrates a peer-to-peer network with a location determining network enabled device and a plurality of network enabled devices connected to the peer-to-peer network, in accordance with an embodiment of the present invention.

A location determining network enabled device 102 may connect to the peer-to-peer network, either through a wireless connection by association with a wireless access point 103 as depicted in FIG. 1, or alternatively through a cellular base station, a Bluetooth connection, or other wireless connection that provides access to the packet switched network. Alternatively, the location determining device may be connected directly to the packet switched network through a wired connection.

Other devices connected the peer-to-peer network may include network connected devices acting as a "node" 104, 105 whose role is to maintain a list of other devices connected through the peer-to-peer network, and to forward on received network messages to those devices on the list, possibly independently, or possibly as a response to a request from another network connected device. As one skilled in the art will be aware, no individual node is required to have a complete list of all devices, as the process of peer-to-peer networking only requires that a union of a set of all nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the nodes on said network.

Further devices connected via the peer-to-peer network may include one or more network connected devices 106, 107 acting as a "miner", whose role is to receive or request location reports and other transaction messages from the peer-to-peer network, process them according to the methods and processes to be described further below, and transmitting the results of said processing back to the peer-to-peer network for inclusion in a shared ledger.

The devices described above may each be implemented through a system comprising a one or a plurality of: general purpose microprocessors, digital signal processors (DSPs), application specific instruction set processors (ASIPs), field programmable gate arrays (FPGAs), dedicated application specific integrated chips (ASICs), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that can be accessed, read, and/or executed by a computer.

Figure 2:
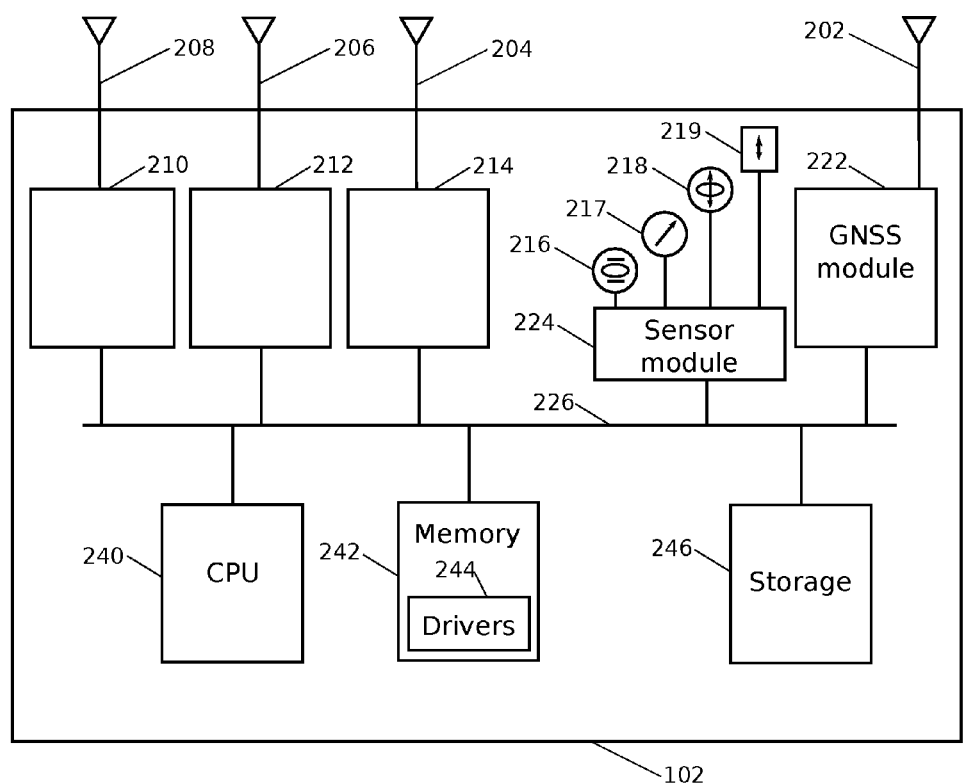
FIG. 2 illustrates a location determining network enabled device, in accordance with an embodiment of the present invention.

An embodiment of the network connected location determining device 102 is presented in FIG. 2, and is now discussed in further detail. The network connected location determining device 102 may comprise a CPU 240 capable of executing instructions stored in a memory 242, and controlling other peripheral components through drivers 244 stored within the memory 242. Further storage 246 may be present.

Optionally, the network connected location determining device 102 may also include an integrated location determining module, comprising one or more of a global navigation satellite system (GNSS) receiver 222, an antenna 202 for said GNSS receiver 222, and a sensor module 224, connected to one or more of an altimeter 216, a magnetometer 217, a gyroscopic sensor 218, and an accelerometer 219. The integrated location determining module may determine a longitude, a latitude, a heading, a velocity, an acceleration, and an altitude of the network connected location determining device 102 to a degree of accuracy through the use of some or all of these components.

The network connected location determining device 102 may also include wireless components comprising one or more wireless modules implemented in firmware or hardware, including a wireless local area network (WLAN) module 210 such as a Wi-Fi adapter utilizing an 802.11 protocol, a wireless wide area network (WWAN) module 212 such as GSM, LIE, or other cellular wireless data communication system, or a Bluetooth module 214, each with one or more associated antennas 208, 206 and 204 respectively. As desired, one or more antennas may be shared between the modules using switching techniques known to those skilled in the art. The wireless components may provide network connectivity to a packet switched network and hence to the peer-to-peer network for the network connected location determining device. Alternately the network connected location determining device may be connected to the packet switching network directly through a wired connection.

The wireless components may also be employed to obtain, or help obtain, a location through techniques such as, but not limited to, time difference of arrival determination of data frames at the wireless component, signal strength determination, signal trilateration, and other wireless position techniques know to those skilled in the art. Furthermore, measurements from the wireless components can be used in conjunction with measurements from the GNSS module 222, and the sensor module 224, to provide a hybrid or combined location result.

Components comprising the network connected location determining device may communicate through a bus 226, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Figure 3:
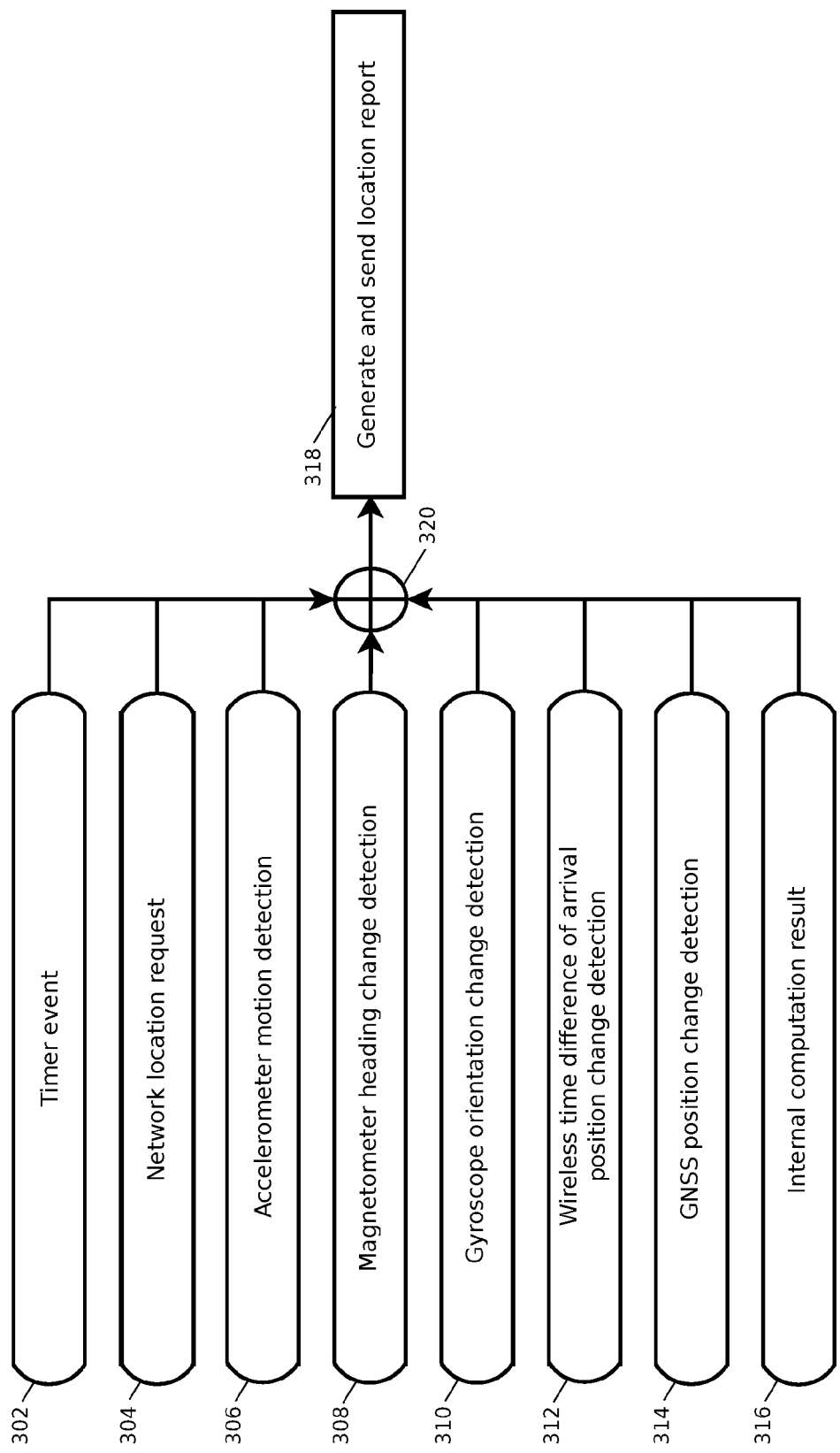
FIG. 3 is a flowchart that shows how the decision to produce a location report by the location determining network enabled device may be made.

In FIG. 3 an exemplary list of possible events, triggers, or occurrences is provided that may cause the network connected location determining device to perform a location determining operation, generate a location report, and send the location report to the peer-to-peer network. Event 302 is an internal step and represents a timer event, in which a one-time timer or a repeat timer may be triggered after a pre-set time, causing step 318 to be executed, in which the network connected location determining device 102 generates and sends a location report.

Event 304 may represent a request from an external entity over the packet switched network for step 318 to be executed. The external request may be issued by an owner of the network connected location determining device, or by a user or entity authorized by the owner, or the option to issue the request may be open to any entity.

Event 306 may represent the network connected location determining device detecting that the accelerometer sensor 219 has experienced a change in output sensor data, reflecting a change in acceleration of the network connected location determining device, and may trigger step 318 to be executed.

Event 308 may represent the network connected location determining device detecting that the magnetometer sensor 217 has experienced a change in output sensor data, reflecting a change in heading of the network connected location determining device or a movement through a varying magnetic field, and may trigger step 318 to be executed.

Event 310 may represent the network connected location determining device detecting that the gyroscopic sensor 218 has experienced a change in output sensor data, reflecting a change in heading or a rotation about an internal or external axis of the network connected location determining device, and may trigger step 318 to be executed.

Event 312 may represent the network connected location determining device detecting that the time difference of arrival of frame data in response to frame request data by the WLAN module 210, the WWAN module 212 or the Bluetooth module 214, has increased or decreased, possibly reflecting a change in the distance of the network connected location determining device from an associated WLAN access point, a WWAN base station or paired Bluetooth device, respectively, and may trigger step 318 to be executed.

Event 314 may represent the network connected location determining device detecting that its position has changed due to a changing position report from the GNSS module 222, and may trigger step 318 to be executed.

Event 316 may represent the completion of some other internal computation result, and may trigger step 318 to be executed.

It will be appreciated by those skilled in the art that although FIG. 3 shows a logical OR 320 applied to events 302, 304, 306, 308, 310, 312, 314 and 316, any other logical operator or combination or logical operators could be applied. For example, the decision to execute step 318 could be undertaken with a logical AND, NOR, or NAND, and applied pairwise to any combination of the events.

Figure 4:
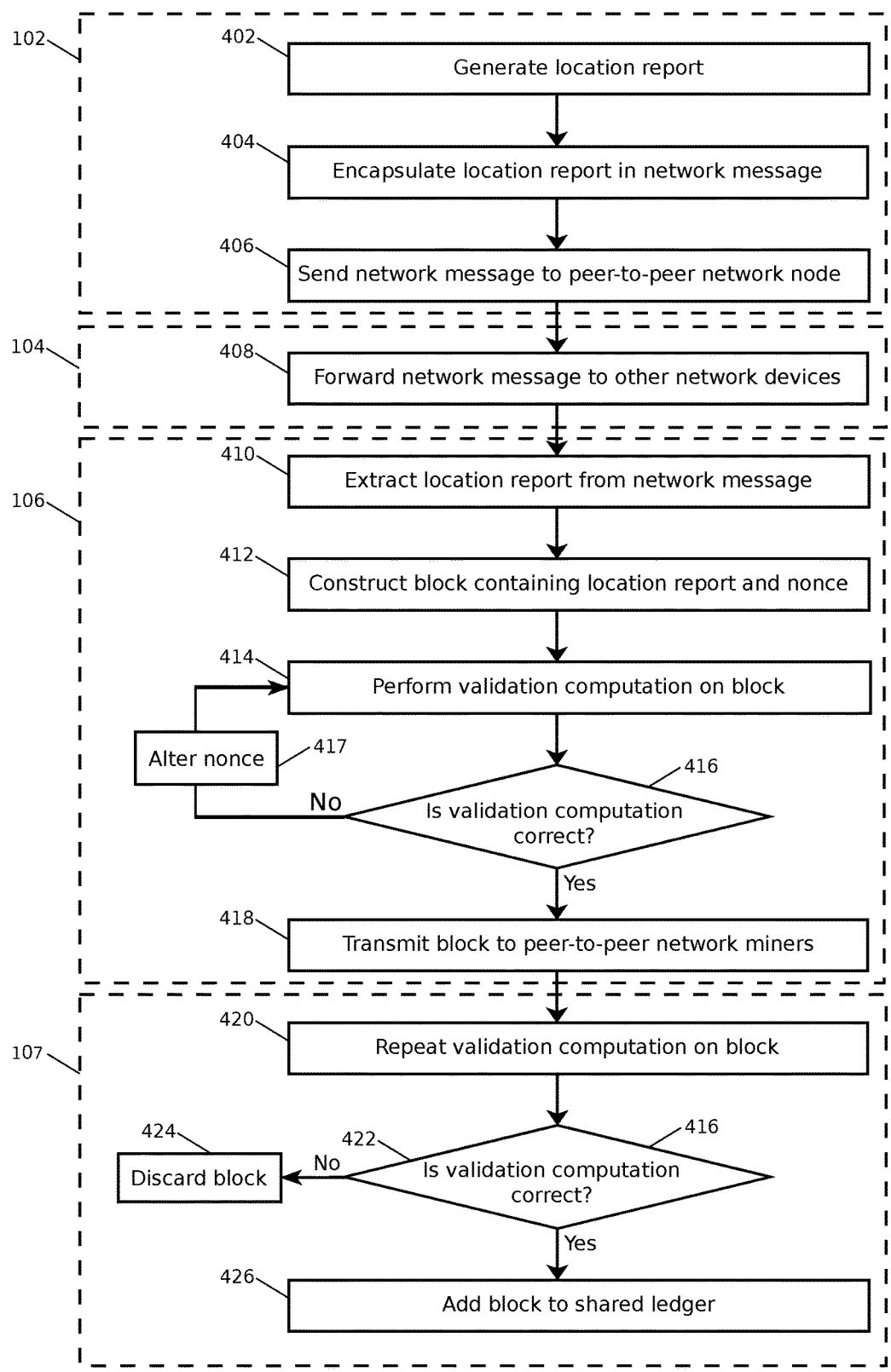
FIG. 4 is a signal flow diagram providing a general overview of a method controlling the flow of location data from the location determining network enabled device to the plurality of network enabled devices connected via a peer-to-peer network for inclusion in the shared ledger.

A high level flow diagram illustrating one possible embodiment of the system and the steps taken therein is presented in FIG. 4. The interaction of the location determining network enabled device 102 with the plurality of network connected devices, and specifically a network connected device functioning as a node 104, and a network connected device functioning as a miner 106, and finally another one of the plurality of network connected devices 107, is shown. The flow of a data comprising the location and other associated information determined by the location determining network enabled device through the location report, inclusion in the successfully generated block, and the appending of said block to the shared ledger is also illustrated through FIG. 4.

Once the network connected location determining device 102 has determined a location and other associated data, it may generate a location report 402. The location report may then be encapsulated in a network message 404 and sent on to the peer-to-peer network 406.

Once the location report encapsulated in the network message has been received by a network connected device acting as a node 104, the node may forward the message to other network connected devices on the peer-to-peer network 408. Other network connected devices may also make requests to the node for network messages that they have not yet received. Through these means, the location report encapsulated in the network message is forwarded to all interested parties on the peer-to-peer network.

Through these network interactions, the location report encapsulated in the network message may arrive at a network connected device acting as a miner 106. The miner may then extract the location report from the network message as per step 410. After the location report has been obtained, the miner may construct a block containing the location report, a nonce, and any other location reports that the miner has previously received and that have not yet been included in the shared ledger as noted in step 412. The block may also contain other messages and elements, which will be detailed further below. The miner may then perform a validation computation on the block 414, further details of which will be provided below. For now, it suffices to note that the validation computation will either return a correct result, or a failure as per step 416. If the validation computation returns a failure, the miner may alter the nonce as per step 417, for example if it is an integer by incrementing or decrementing the value of the number by a chosen amount, or by choosing a new random value, and may then repeat the validation computation on the new block as per step 414. If the validation computation is correct, the block has been successfully verified and the miner may transmit it to the peer-to-peer network 418.

Through transmission to the peer-to-peer network, the block may arrive at another network connected device 107, which may constitute another miner, or another node. The network connected device 107 may then repeat the same validation computation on the block 420 as previously performed by the miner 106 in step 414, and the validation computation will return either a successful result or a failure 422. If the computation result is a failure, the network connected device 107 may discard the block, as shown in step 424. If the validation computation produces a successful result, then the network connected device 107 may add the block to a copy of the shared ledger 426.

Figure 5:
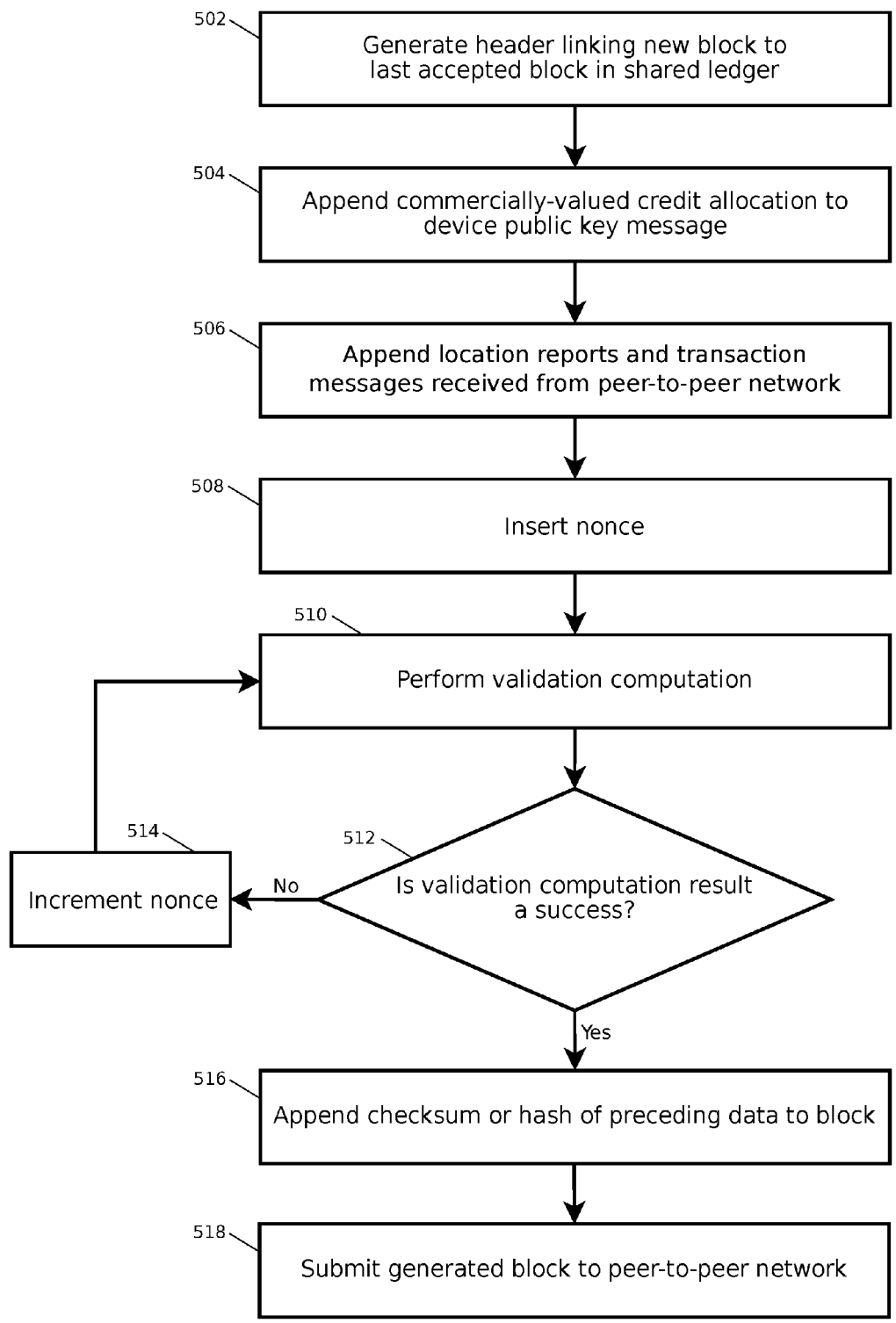
FIG. 5 is a flowchart that shows an example method for the first of the plurality of network enabled devices to generate and broadcast a validation computation result, according to one embodiment of the invention.

FIG. 5 presents a flowchart providing further details for one possible embodiment of a miner, and provides a specification for the steps taken once a location report or a plurality of location reports have been received by a network connected device acting as a miner.

In step 502 the miner generates a header for a new block, which in one embodiment may contain data indicating the start of the block, and may contain a link back to the last accepted block in the shared ledger, for example through inclusion of a hash of the previous block. The header may also contain a time stamp.

In step 504 the miner may append a message to the block, commonly known to those skilled in the art as a "block reward", which allocates a number of commercially-valued credits to a public key associated with a network connected device. In other embodiments the number of commercially-valued credits may be associated with one or more of: an email address, an IP address or a MAC address.

In step 506 the miner may append none, one, or a plurality of location reports received from the peer-to-peer network to the block. The miner may also append a count of the number of reports added to the block.

In step 508 the miner may insert a nonce into the block. The nonce may comprise a number, a string, or a binary data, and may be selected randomly or according to a predetermined algorithm, for example, the nonce may initially be the number 1, and subsequently incremented by one until a successful result is returned from the validation computation.

In step 510 the miner may conduct a validation computation on the block in its current state. The validation computation may comprise applying a one or more hash functions to the block, and then possibly applying the one or more hash functions or a different one or more hash functions repeatedly one or more times to the output of the previous hash function applied. The hash functions used may include SHA, RIPEMD, Whirlpool, Scrypt, HAS-160, or other cryptographic hash function where a hash output cannot be determined from hash input other than by the application of the cryptographic hash function to the hash input. A final result of step 510 may be a number.

In step 512 the final result is compared to a target value. The target value may be a fixed value agreed upon by a plurality of participating devices in the peer-to-peer network, or it may be a dynamic value determined in one embodiment by the average time taken for the miners in the peer-to-peer network to produce the last K blocks, where K is a fixed value agreed upon by the plurality of participating devices in the peer-to-peer network. When the final result is compared to the target value, the result may be determined to be successful if the final result is greater than the target. In other embodiments of the invention the result may be determined to be successful if the final result is greater or equal to the target value, or less than the target value, or less than or equal to the target value, or by some other Boolean operation on the final result and the target value.

If the result of step 512 is "no", then step 514 may be executed. The miner may alter the nonce in the block, for example by incrementing its value if it is a number, or by selecting a new nonce at random, and may then proceed to step 510 again. The repeated cycle of step 510, step 512, and step 514 is often described in the art as a "proof of work" effort.

If the result of step 512 is "yes", then step 516 may be executed. The miner may append a checksum or cryptographic hash to the block, which allows third parties to verify that the preceding data is correct and has not been altered or corrupted during data transfer.

Finally, the miner may execute step 520, by sending the completed block to the peer-to-peer network for inspection by other network connected devices, and subsequent inclusion in the shared ledger.

Figure 6:
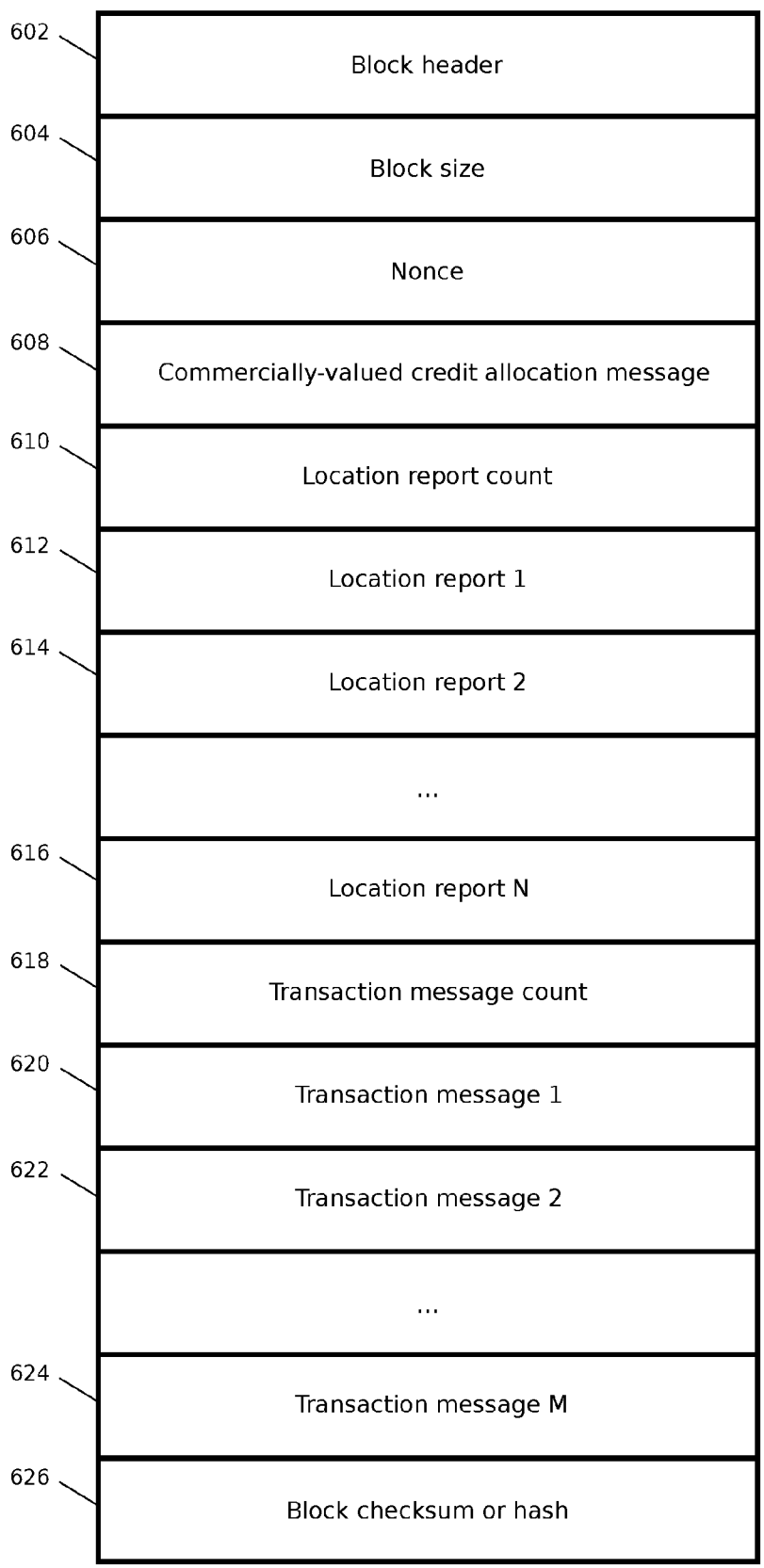
FIG. 6 is a block diagram illustrating the structure of a possible embodiment of the blocks in shared ledger.

FIG. 6 is a diagram defining one exemplary embodiment of a block in terms of elements generated through the process described previously in FIG. 5. It should be noted that in although the elements for inclusion in the block are presented in a given order in the preferred embodiment detailed above, the chosen ordering within the block may be decided in an arbitrary manner, provided all participants on the peer-to-peer network agree to the same ordering.

Element 602 is a header, and may comprise: an identifier indicating that the block is intended for a peer-to-peer geolocation system such as is described in this disclosure; a link to the preceding block, for example through a block number identifier or a cryptographic hash of the preceding block; a time stamp.

Element 604 is an integer indicating the block size.

Element 606 is a nonce.

Element 608 is a commercially-valued credit allocation message, and may include a claim to a number of commercially-valued credits to be allocated.

Element 610 is an integer indicating the number of location reports included in the block. It can be zero, or an integer greater than zero. In FIG. 6 an example is presented in which N location reports are included in the block.

Element 612 is an example of a first location report received from the peer-to-peer network and included in the block.

Element 614 is an example of a second location report received from the peer-to-peer network and included in the block.

Element 616 is an example of an Nth location report received from the peer-to-peer network and included in the block.

Element 618 is an integer indicating a number of transaction messages may be included in the block. It can be zero, or an integer greater than zero. In FIG. 6 an example is presented in which M transaction messages are included in the block. A transaction message may represent a transfer of commercially-valued credits from an allocation to a one public cryptographic key to an allocation to a second public cryptographic key, and may be signed with a private cryptographic key to authorize the transfer.

Element 620 is an example of a first transaction message received from the peer-to-peer network or generated by the miner and included in the block.

Element 622 is an example of a second transaction message received from the peer-to-peer network or generated by the miner and included in the block.

Element 624 is an example of a Mth transaction message received from the peer-to-peer network or generated by the miner and included in the block.

In a preferred embodiment of the invention, elements 602 through 624 may be cryptographically hashed during the validation computation in the proof of work activity to provide a final result for comparison with the target value.

Element 626 is a checksum or cryptographic hash of elements 602 through 624 that may be included in the block, for example to allow third parties to verify that the preceding data is correct and has not been altered or corrupted during data transfer. In one embodiment it may be the result obtained from the proof of work activity during the validation computation.

Figure 7:
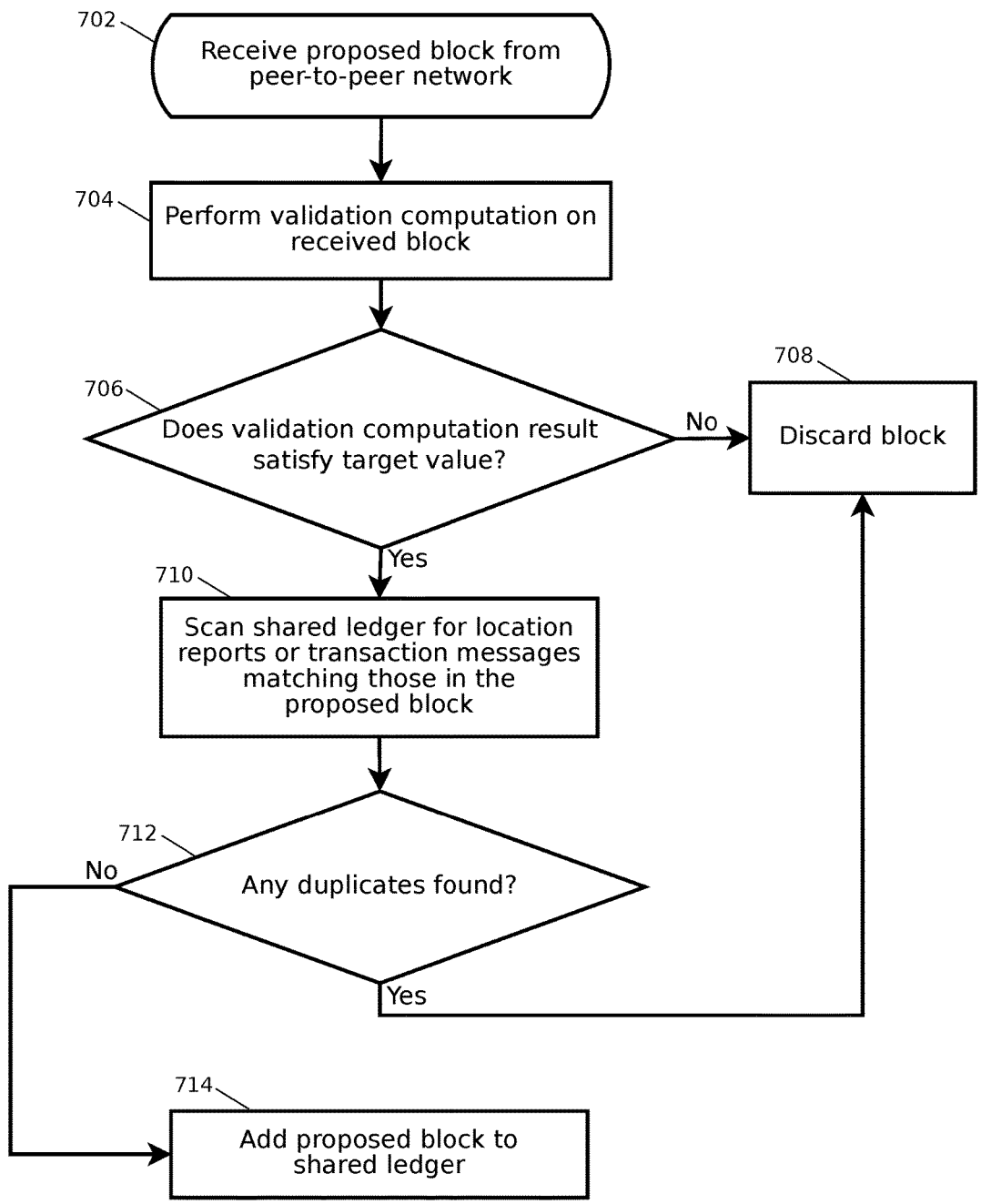
FIG. 7 is a flowchart illustrating a method for including a block containing a location report and a commercially-valued credit allocation in a shared ledger, according to one embodiment of the invention.

One possible embodiment of a network connected device, henceforth referred to as a verifier, for verifying a block submitted to the peer-to-peer network by a miner is presented in FIG. 7. In step 702 the network connected device may receive the block from the peer-to-peer network.

In step 704 the verifier may perform a same validation computation on the submitted block, as performed by the miner.

In step 706 the verifier may examine a result to determine if the block satisfies the validation computation. If the result is "no", the network connected device may proceed to step 708, in which the block is discarded. If the result is "yes", the network connected device may proceed to step 710, in which the shared ledger may be scanned for location reports or transaction messages matching those in the submitted block.

The result from step 710 may be evaluated by the verifier in step 712. If the result of step 712 is "yes", then duplicates have been found, and the verifier proceeds to step 708, in which the block is discarded. If the result of step 712 is "no", then no duplicates were found, and the verifier proceeds to step 714, in which the block is added to the shared ledger.

Figure 8:
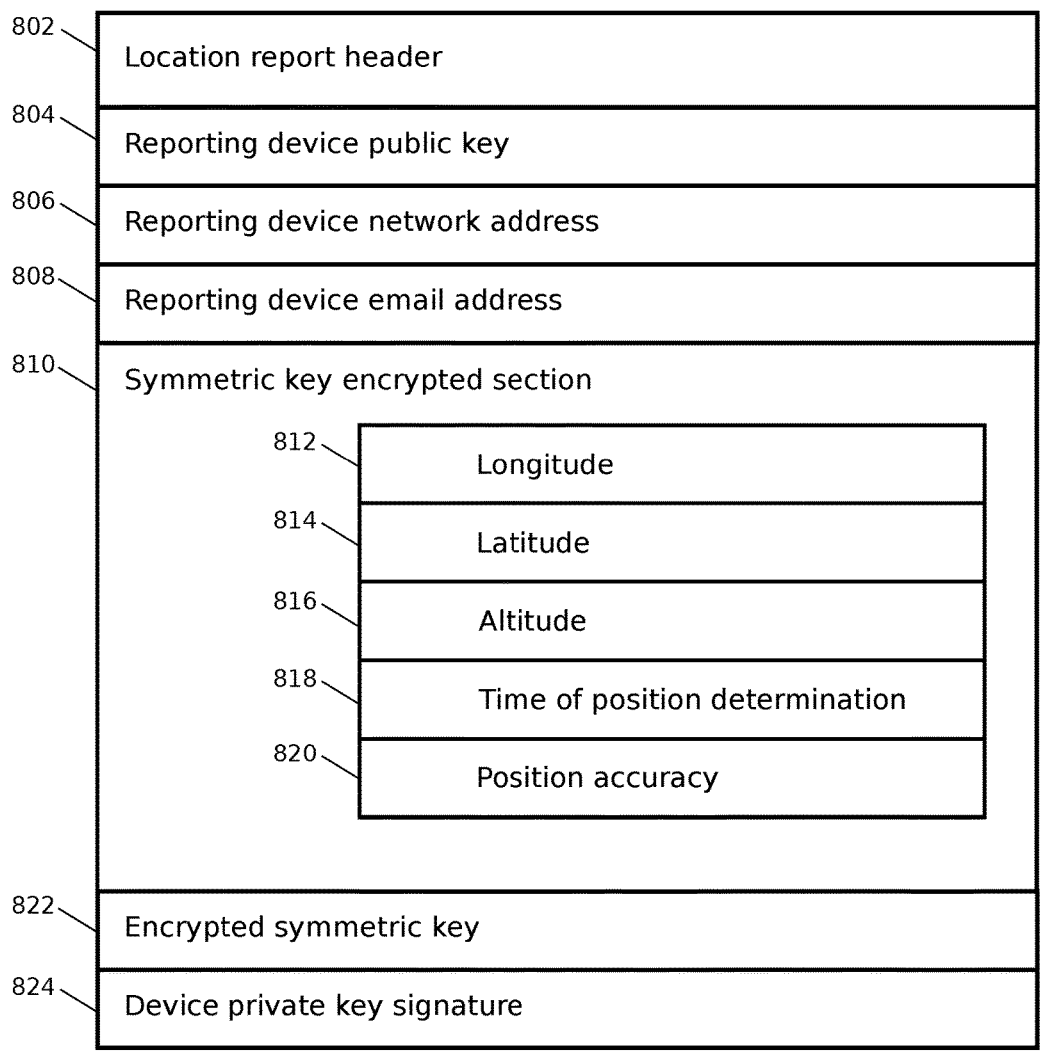
FIG. 8 is a block diagram illustrating a possible structure of a location report encrypted with a cryptographic key, and with the cryptographic key itself encrypted with a public key and appended to the location report.

FIG. 8 presents a possible embodiment of a location report message. The location report header 802 may contain a marker indicating that the rest of the message contains a location report, and other header information such as the length of the report.

The location report may contain the public key 804, the network address 806 and the email address 808 of the network connected location determining device 102 that is to submit the location report.

A data payload of the location report may comprise a longitude 812, a latitude 814, an altitude 816, a time of position determination 818, and a position accuracy 820. The data payload may be encrypted with a cryptographic symmetric key 810, for example to maintain the privacy of the location determined by the network connected location determining device.

The location report may also comprise the symmetric key of 810 encrypted with a public key 822 of an alternate network connected device. This may allow the alternate network connected device to decrypt the symmetric key using its private key, and subsequently decrypt the data payload 812-820, using the decrypted symmetric key.

The location report may also comprise a digital signature 824, generated with the private key of the network connected location determining device, in order to provide for the veracity of the submitted location report.

As will be appreciated from the above discussion, an advantage of the systems and methods of this disclosure includes distributing effort required to maintain and extend a shared ledger, a file, or a database of location information pertaining to a plurality of network connected location determining devices, thereby providing protection from an existence of a single point of failure, and reducing cost to individual users of the system. Further, these techniques offer protection of the location data stored through use of cryptographic keys and digital signatures. Finally, the techniques also allow for rewarding of owners of network connected devices participating in the peer-to-peer network and charging of owners or users of network connected location determining devices providing location reports to the system.

What is claimed is:

1. A method for sharing location information comprising:
sending to a peer-to-peer network, by a network enabled location determining device, a location report, said location report comprising two or more of: location coordinates of the network enabled location determining device, an altitude of the network enabled location determining device, a velocity of the network enabled location determining device, and an acceleration of the network enabled location determining device; wherein the network enabled location determining device is associated with a first network address and a first public-private key pair; and
performing a validation computation on the location report by a first device of a plurality of network enabled devices connected to the peer-to-peer network, said first device being associated with a second network address and a second public-private key pair; and
transmitting the location report and a result of the validation computation, by the first device, through said peer-to-peer network, to a remainder of the plurality of network enabled devices connected to the peer-to-peer network; and
adding to a shared ledger stored by the remainder of the plurality of network enabled devices connected to the peer-to-peer network, the location report and the result of the validation computation.

2. The method of claim 1, wherein the location report further comprises one or more of: public key of the first public-private key pair, the first network address, and an email address of the network enabled location determining device.

3. The method of claim 1, further comprising:
signing the location report with a private key of the first public-private key pair of the network enabled location determining device.

4. The method of claim 1, further comprising:
constructing a collection of location reports from a plurality of network enabled location determining devices; and
performing the validation computation on the collection of location reports from the plurality of network enabled location devices; and
adding the collection of location reports from the plurality of network enabled location determining devices to the shared ledger.

5. The method of claim 1, further comprising: encrypting at least part of the location report by the network enabled location determining device using a cryptographic key.

6. The method of claim 5, wherein the location report also comprises the cryptographic key encrypted with a public key of a public-private key pair associated with a second of the plurality of network enabled devices connected to the peer-to-peer network.

7. The method of claim 5, further comprising: sending a subsequent report by the network enabled location determining device, containing the cryptographic key encrypted with a public key of a public-private key pair associated with a second device of the plurality of network enabled devices connected to the peer-to-peer network.

8. The method of claim 1, further comprising:
producing the validation computation by the first device before any of the remainder of the plurality of network enabled devices connected to the peer-to-peer network produce said validation computation; and
creating a record of a number of commercially-valued credits associated with a public key of the second private-public key pair associated with the first device of the plurality of network enabled devices; and
including the record of the number of commercially-valued credits in the shared ledger along with the result of the validation computation and the location report.

9. The method of claim 1, further comprising:
including in the location report, an offering of a number of commercially-valued credits associated with a public key and recorded on the shared ledger, by the network enabled location determining device; and
transferring said number of commercially-valued credits to a second public key of the second public-private key pair associated with the first device when including the result of the validation computation and the location report in the shared ledger.

10. The method of claim 9, further comprising:
associating the commercially-valued credits with one or more of: a network address, a cryptographic key, an email address.

11. A system comprising:
a mobile device comprising: a location determining component; one or more processors; and storage media comprising computer instructions;
a plurality of network connected devices connected to a peer-to-peer network, each network connected device comprising: one or more processors and storage media comprising computer instructions;
wherein said mobile device is connected via the peer-to-peer network to the plurality of network connected devices
wherein when computer instructions are executed on the one or more processors of the mobile device and on the one or more processors of a one or more of the plurality of network connected devices, operations are caused comprising:
sending to the peer-to-peer network, by the mobile device, a location report, said location report comprising two or more of: location coordinates of the mobile device, an altitude of the mobile device, a velocity of the mobile device, and an acceleration of the mobile device, wherein the mobile device is associated with a network address and a first public-private key pair; and
performing a validation computation on the location report by a first device of the plurality of network connected devices, said first device being associated with a second network address and a second public-private key pair;
transmitting the location report and a result of the validation computation, by the first device, through the peer-to-peer network, to a remainder of the plurality of network connected devices connected to the peer-to-peer network; and
adding to a shared ledger stored by the remainder of the plurality of network connected devices connected to the peer-to-peer network, the location report and the result of the validation computation.

12. The system of claim 11, wherein the location report produced by the mobile device further comprises one or more of: public key of the first public-private key pair, the network address, and an email address of the mobile device.

13. The system of claim 11, further comprising: signing the location report with a private key of the first public-private key pair of the mobile device, by the mobile device.

14. The system of claim 11, further comprising:
constructing a collection of location reports from a plurality of mobile devices by the first device;
performing the validation computation on the collection of location reports from the plurality of mobile devices by the first device; and
adding the collection of location reports from the first of the plurality of mobile devices to the shared ledger stored by the plurality of network connected devices.

15. The system of claim 11, further comprising: encrypting an at least part of the location report by the mobile device using a cryptographic key.

16. The system of claim 15, wherein the location report also comprises the cryptographic key encrypted with a public key of a public-private key pair associated with a second device of the plurality of network enabled devices connected to the peer-to-peer network.

17. The system of claim 15, further comprising:
sending a subsequent report by the mobile device, containing the cryptographic key encrypted with a public key of a public-private key pair associated with a second of the plurality of network enabled devices connected to the peer-to-peer network.

18. The system of claim 11, further comprising:
producing the validation computation by the first device before any of the remainder of the plurality of network enabled devices connected to the peer-to-peer network produce said validation computation; and creating a record of a number of commercially-valued credits associated with a public key of the second private-public key pair associated with the first device; and including the record of the number of commercially-valued credits in the shared ledger along with the result of the validation computation and the location report.

19. The system of claim 11, further comprising:

including in the location report an offering of a number of commercially-valued credits associated with a public key and recorded on the shared ledger, by the mobile device; and transferring said number of commercially-valued credits to a second public key of the second public-private key pair associated with the first device when including the result of the validation computation and the location report in the shared ledger.

20. The system of claim 19, further comprising: associating the commercially-valued credits with one or more of: a network address, a cryptographic key, an email address.

* * * * *